3,341,401
HALO - META - ISOPROPYLPHENYL N-METHYLCARBAMATES AND PESTICIDAL COMPOSITIONS
John R. Kilsheimer, Westfield, N.J., and Herbert H. Moorefield, Raleigh, N.C., assignors to Union Carbide Corporation, a corporation of New York
No Drawing. Filed Dec. 11, 1961, Ser. No. 158,561
15 Claims. (Cl. 167—30)

The present invention relates to novel chemical compounds and pesticidal compositions containing them. More particularly, the invention relates to halogen-substituted meta-isopropylphenyl N-methylcarbamates and pesticidal compositions containing same.

The compounds of this invention comprise meta-isopropylphenyl N-methylcarbamates substituted in at least one of the available phenyl ring positions with a chlorine atom or a bromine atom.

The compounds of this invention can be graphically depicted by the following general formula, wherein X is a member selected from the group consisting of chlorine and bromine, and $n$ is an integer having a value of from 1 to 4:

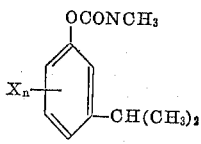

As illustrative of the compounds of this invention there can be mentioned 2-chloro-5-isopropylphenyl N-methylcarbamate,
3-chloro-5-isopropylphenyl N-methylcarbamate,
4-chloro-3-isopropylphenyl N-methylcarbamate,
2-chloro-3-isopropylphenyl N-methylcarbamate,
2,4-dichloro-5-isopropylphenyl N-methylcarbamate,
2,3-dichloro-5-isopropylphenyl N-methylcarbamate,
2,6-dichloro-3-isopropylphenyl N-methylcarbamate,
3,4-dichloro-5-isopropylphenyl N-methylcarbamate,
2,5-dichloro-3-isopropylphenyl N-methylcarbamate,
2,4-dichloro-3-isopropylphenyl N-methylcarbamate,
5-isopropyl-2,3,4-trichlorophenyl N-methylcarbamate,
5-isopropyl-2,3,6-trichlorophenyl N-methylcarbamate,
5-isopropyl-2,4,6-trichlorophenyl N-methylcarbamate,
5-isopropyl-3,4,6-trichlorophenyl N-methylcarbamate,
and 5-isopropyl-2,3,4,6-tetrachlorophenyl N-methylcarbamate.

Also exemplary are 2-bromo-5-isopropylphenyl N-methylcarbamate,
3-bromo-5-isopropylphenyl N-methylcarbamate,
4-bromo-3-isopropylphenyl N-methylcarbamate,
2-bromo-3-isopropylphenyl N-methylcarbamate,
2,4-dibromo-5-isopropylphenyl N-methylcarbamate,
2,3-dibromo-5-isopropylphenyl N-methylcarbamate,
2,6-dibromo-3-isopropylphenyl N-methylcarbamate,
3,4-dibromo-5-isopropylphenyl N-methylcarbamate,
2,5-dibromo-3-isopropylphenyl N-methylcarbamate,
2,4-dibromo-3-isopropylphenyl N-methylcarbamate,
5-isopropyl-2,3,4-tribromophenyl N-methylcarbamate,
5-isopropyl-2,3,6-tribromophenyl N-methylcarbamate,
5-isopropyl-2,4,6-tribromophenyl N-methylcarbamate,
5-isopropyl-3,4,6-tribromophenyl N-methylcarbamate,
and 5-isopropyl-2,3,4,6-tetrabromophenyl N-methylcarbamate.

Further illustrative are 4-bromo-2-chloro-5-isopropylphenyl N-methylcarbamate,
2-bromo-4-chloro-5-isopropylphenyl N-methylcarbamate,
2,4-dibromo-6-chloro-5-isopropylphenyl N-methylcarbamate,
4,5-dibromo-2,6-dichloro-3-isopropylphenyl N-methylcarbamate,
2,6-dibromo-4,5-dichloro-3-isopropylphenyl N-methylcarbamate,
2,5-dibromo-4,6-dichloro-3-isopropylphenyl N-methylcarbamate,
3-bromo-2,4-dichloro-5-isopropylphenyl N-methylcarbamate, and the like.

The compounds of this invention can be synthesized in various ways. For example, meta-isopropylphenol can be reacted with a molecular halogen source, preferably gaseous chlorine or bromine, in the presence of a catalyst, to give a halogenated phenol. Such a halogenation reaction is conducted in an inert organic solvent not susceptible to attack by halogen, such as carbon tetrachloride, chloroform, ethylene dichloride, tetrachloroethane, and the like. Suitable catalysts are the metal chlorides, such as ferric trichloride, aluminum trichloride, zinc dichloride, and the like, and iodine. The reaction can be carried out at temperatures of from about 25° C. to about 125° C., and is preferably effected at between 50° C. and 70° C.

The halogenated phenol produced by the reaction is then reacted with methyl isocyanate to give the desired carbamate. The methyl isocyanate addition can be carried out, generally, by contacting the phenol with methyl isocyanate in an inert organic solvent, and preferably in the presence of a tertiary amine or organotin catalyst. The reaction may be effected at temperatures ranging from about 10° C. to about 130° C., and is preferably carried out between room temperature and about 80° C. Generally, temperatures in excess of about 130° C. are to be avoided in view of the temperature sensitivity of the product carbamate. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like. The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of methyl isocyanate and the phenol are sufficient. The mol ratio of methyl isocyanate to phenol can range from about 0.25:1 to about 2:1, but preferably an equimolar amount or slight excess of methyl isocyanate is employed to insure that the phenol is completely reacted. The reaction time may vary from about 5 minutes to about 7 days, but normally, when operating in the preferred temperature range, reaction times of from about one-half hour to about five hours are sufficient for complete reaction.

The carbamate product formed, either a solid or oily liquid, can be recovered from the reaction mixture by means known to the art, e.g. by vacuum-distillation to drive off solvent and excess isocyanate.

It can be seen that the above-described synthetic route for obtaining the compounds of this invention will not be particularly inefficacious for preparing compounds having a halogen substituent on the phenyl ring position that is meta to both the hydroxy and isopropyl groups, said groups being orthopara directors. Accordingly, recourse can be had to other synthetic routes. For example, compounds of this invention can be obtained by first reacting chlorobenzene with two mole equivalents of propylene to give 3,5-diisopropylchlorobenzene, which, in turn is oxidized to 3-chloro-5-isopropylphenol as described, for example in "Phenol from Cumene," Petroleum Refiner 32 (11), 154 (1953). The resulting phenol can then be reacted with methyl isocyanate as above-described to produce compounds of this invention.

A third preparative procedure which may be utilized involves the reaction of a suitably halogenated phenol with phosgene to form the corresponding chloroformate and reacting the chloroformate with methylamine to form the corresponding N-methylcarbamate and HCl. If desired, sodium phenolate may be used in place of phenol, in which case NaCl instead of HCl is the reaction product. In the formation of the chloroformate, the phosgene is dissolved in toluene or benzene or other suitable organic solvents and then added to the water solution of the hydroxy compound or its sodium salt at a temperature of from about −30° C. to 20° C. The reaction is slightly exothermic so that some external cooling is usually necessary. The chloroformate separates in the organic phase which is separated from the aqueous phase carrying the hydrogen or sodium chloride. The chloroformate may then either be isolated by distillation or used without further purification. The reaction involving the addition of the chloroformate to the amine is carried out in the presence of solvents for the amine, such as water or dioxane. The reaction temperature is preferably in the range from 10° C. to 50° C. Below 10° C. the reaction proceeds but the rate is too slow and above 50° C. the reaction rate is so rapid that loss of low boiling amines may occur and some decomposition may take place.

The following examples are illustrative.

EXAMPLE I

A mixture of 272 grams of 3-isopropylphenol (2.0 moles), 500 milliliters of carbon tetrachloride solvent and 1 gram of ferric chloride catalyst was heated at 60° C. while 270 grams of sulfuryl chloride (2.0 moles) were fed over a 2 hour period. After refluxing for an hour, the reaction mixture was fractionated under reduced pressure to obtain a first fraction of 37 grams of 2-chloro-5-isopropylphenol having a boiling range of 101–103° C. at 8 mm. Hg and a second fraction of 147 grams of 4-chloro-3-isopropylphenol having a boiling range of 122–123° C. at 8 mm. Hg. The assigned structures were confirmed by infrared spectral analysis.

EXAMPLE II

A mixture of 28 grams (0.16 mole) of 2-chloro-5-isopropylphenol, 100 milliliters of ethyl ether solvent, 5 drops of pyridine catalyst and 22 grams (.39 mole) of methyl isocyanate was sealed in pressure bottle for 5 days at autogenous temperature. The reaction mixture was distilled to a kettle temperature of 100° C. at 2 mm. Hg to obtain 29 grams of 2-chloro-5-isopropylphenyl N-methylcarbamate having the following analysis.

Found: C, 58.57%; H, 6.65%; N, 6.86%. Theoretical: C, 57.90%; H, 6.14%; N, 6.15%.

EXAMPLE III

A mixture of 40 grams (0.23 mole) of 4-chloro-3-isopropylphenol, 100 milliliters of benzene solvent, 5 drops of pyridine catalyst and 27 grams (.47 mole) of methyl isocyanate was sealed in a pressure bottle for 3 days at autogenous temperature. After removal of benzene solvent, the crude product was crystallized from xylene to obtain 23 grams of 4-chloro-3-isopropylphenyl N-methylcarbamate having the following analysis.

Found: C, 58.32%; H, 6.36%; N, 6.31%. Theoretical: C, 57.90%; H, 6.14%; N, 6.15%.

The yield of crystallized product carbamate, which had a melting point of 89° C., was 44 percent.

EXAMPLE IV

A mixture of 408 grams of 3-isopropylphenol (3.0 moles), 500 milliliters of carbon tetrachloride solvent and 1 crystal of iodine catalyst was stirred at 25–30° C. while 504 grams of bromine (3.15 moles) were fed dropwise over a period of 2 hours. After heating at 50° C. for an hour, the mixture was cooled to 25° C. and washed successively with water, sodium bicarbonate solution, water, and water. The washed oil layer was fractionated under reduced pressure to obtain the following fractions:

| Compound | Boiling Range at 4 mm., ° C. | Weight, grams |
| --- | --- | --- |
| 2-bromo-5-isopropylphenol | 89 | 132 |
| 4-bromo-3-isopropylphenol | 118–120 | 223 |
| 2,4-dibromo-5-isopropylphenol | 123–125 | 46 |

The assigned structures were confirmed by infrared analyses. The approximate yields (including mid-fractions) of these fractions were 40 percent, 35 percent, and 5 percent, respectively.

EXAMPLE V

A mixture of 40 grams (0.19 mole) of 2-bromo-5-isopropylphenol, 100 milliliters of benzene solvent, 5 drops of pyridine catalyst and 13 grams of methyl isocyanate (0.23 mole) was sealed in a pressure bottle for 4 days at autogenous temperature. The reaction mixture was stripped under reduced pressure to obtain 44 grams (85% yield) of 2-bromo-5-isopropylphenyl N-methylcarbamate having the following analysis.

Found: C, 48.83%; H, 5.44%; N, 5.15%; Br, 28.40%. Theoretical: C, 48.53%; H, 5.15%; N, 5.15%; Br, 29.41%.

This product was dissolved in xylene-petroleum ether mixture and cooled to obtain pure 2-bromo-5-isopropylphenyl N-methylcarbamate having a melting point of 65° C.

EXAMPLE VI

A mixture of 40 grams (0.19 mole) of 4-bromo-3-isopropylphenol, 100 milliliters of benzene solvent, 5 drops of pyridine catalyst and 13 grams of methyl isocyanate (0.23 mole) was sealed in a pressure bottle for 4 days at autogenous temperature. The reaction mixture was stripped under reduced pressure to obtain 52 grams (100% yield) of crude carbamate having a melting point of about 60° C. This material was crystallized from a xylene-petroleum ether mixture to obtain 4-bromo-3-isopropylphenyl N-methylcarbamate having a melting point of 78° C. and the following analysis.

Found: N, 5.60%; Br, 30.17%. Theoretical: N, 5.15%; Br, 29.41%.

EXAMPLE VII

A mixture of 20 grams (0.07 mole) of 2,4-dibromo-5-isopropylphenol, 100 milliliters of benzene solvent, 5 drops of pyridine catalyst and 5 grams of methyl isocyanate (0.09 mole) was sealed in a pressure bottle for 3 days at autogenous temperature. The reaction mixture was stripped under reduced pressure to remove solvent. The residue was crystallized from xylene to obtain 20 grams (83% yield) of 2,4-dibromo-5-isopropylphenyl N-methylcarbamate having a melting point of 105° C. and the following analysis.

Found: C, 38.09%; H, 4.00%; N, 4.96%; Br, 42.88%. Theoretical: C, 37.61%; H, 3.70%; N, 3.99%; Br, 45.58%.

The compounds of this invention possess broad-spectrum pesticidal activity and exhibit particularly outstanding effectiveness as aphidicides and miticides. Their activity against aphids and mites makes these compounds particularly valuable because other carbamate pesticides, while known to have good broad-range activity, are often deficient in their failure to exhibit strong aphidicidal and miticidal action.

The following compounds, representative of those within the compass of this invention, were tested as pesticides.

Compound 1.—2-chloro-5-isopropylphenyl N-methylcarbamate
Compound 2.—2-bromo-5-isopropylphenyl N-methylcarbamate
Compound 3.—4-chloro-3-isopropylphenyl N-methylcarbamate
Compound 4.—4-bromo-3-isopropylphenyl N-methylcarbamate
Compound 5.—2,4-dibromo-5-isopropylphenyl N-methylcarbamate In one series of tests, the ability of these compounds to inhibit fly brain cholinesterase was determined.

*Cholinesterase inhibition determination*

A Warburg Respirometer was used to determine the amount of chemical required to inhibit cholinesterase activity to the 50 percent level ($I_{50}$). The cholinesterase determination was made by a manometric measurement of $CO_2$ (evolved from a carbonate buffer), resulting from the substrate, acetylcholine. The enzyme was derived from a brei of three house fly heads per ml. of buffer (0.15M NaCl, 0.04M $MgCl_2$, 0.025M $NaHCO_3$, pH 7.9). Inhibitors (chemical to be tested) were added in 0.1 ml. aliquots in acetone and after 10 minutes equilibration to the bath temperature, 37° C., and a 5 minute gassing period with 95 percent $N_2$-5 percent $CO_2$ mixture, the substrate, 0.3 ml. of 0.2M acetylcholine bromide was added. The activity of a graded series of preparations was measured after 30 minutes and compared with an unpoisoned standard to determine the percent inhibition of the enzyme. Fifty percent inhibition was derived by plotting the probit of percent inhibition against the log molar concentration of the compound.

The results of this test are set forth in Table I, below. For purposes of comparison also included are the cholinesterase inhibition $I_{50}$ values for a number of related carbamates shown by Kolbezen et al., in "Insecticide Structure and Activity," Agriculture and Food Chemistry, vol. 2 (1954), at page 866. The following compounds, shown by Kolbezen, are designated herein as Compounds M-T:

Compound M.—o-Isopropylphenyl N-methylcarbamate
Compound N.—p-Isopropylphenyl N-methylcarbamate
Compound O.—o-Chlorophenyl N-methylcarbamate
Compound P.—m-Chlorophenyl N-methylcarbamate
Compound Q.—p-Chlorophenyl N-methylcarbamate
Compound R.—2,4-dichlorophenyl N-methylcarbamate
Compound S.—2,4,5-trichlorophenyl N-methylcarbamate
Compound T.—2,4,6-trichlorophenyl N-methylcarbamate

TABLE I

| Compound: | $I_{50}$ |
|---|---|
| 1 | $7 \times 10^{-9}$ |
| 2 | $6 \times 10^{-8}$ |
| 3 | $3 \times 10^{-7}$ |
| 4 | $3 \times 10^{-8}$ |
| 5 | $3 \times 10^{-8}$ |
| M | [1] $6 \times 10^{-6}$ |
| N | [1] $7 \times 10^{-5}$ |
| O | [1] $5 \times 10^{-6}$ |
| P | [1] $5 \times 10^{-5}$ |
| Q | [1] $2.4 \times 10^{-4}$ |
| R | [1] $5 \times 10^{-4}$ |
| S | [1] $1.4 \times 10^{-5}$ |
| T | [1] $1.7 \times 10^{-5}$ |

[1] These values were determined as set forth in the Kolbezen et al. article.

It can be seen from Table I that the compounds of this invention are vastly superior in effectiveness to the compounds shown by Kolbezen.

Compounds 1 to 5 were further tested as aphidicides in a second series of tests.

Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids. The test compounds were formulated by diluting the stock suspension with water to give various concentrations of test compound in the final formulation. The potted plants (one pot per compound tested), infested with 100–150 aphids, were placed on a revolving turntable and sprayed with 100–110 milliliters of test compound formulation by use of a DeVilbis spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. After spraying, the pots were placed on their sides on a sheet of white standard mimeograph paper which had been previously ruled into squares to facilitate counting. Temperature and humidity in the test room during the 24-hour holding period were 80±5° F. and 50±5 percent, respectively. Aphids which fell onto the paper and were unable to remain standing after being uprighted were considered dead. Aphids remaining on the plants were observed closely for movement and those which were unable to move the length of the body upon stimulation by prodding were considered dead. Each compound was rated by determining the concentration of compound required to kill one-half of the aphid population.

The results of these tests are set forth in Table II, below.

TABLE II

| Compound: | Aphid Test Rating[2] |
|---|---|
| 1 | 10 |
| 2 | 7 |
| 3 | 30 |
| 4 | 20 |
| 5 | 20 |

[2] Values are the concentration of compound in parts of compound per million parts of applied formulation, by weight, required to kill one-half of the aphid population.

In a third series of tests, Compounds 1 to 4 were evaluated as miticides.

Adults and nymph stages of the two-spotted mite (*Tetranychus telarium* L.), reared on Tendergreen bean plants at 80±5° F. and 50±5 percent relative humidity, were the test organisms. Infested leaves from a stock culture were placed on the primary leaves of two bean plants six to eight inches in height, growing in a two and a half inch clay pot. 150–200 mites, a sufficient number for testing, transferred from the excised leaves to the fresh plants in a period of twenty-four hours. Following the twenty-four hour transfer period, the excised leaves were removed from the infested plants. The test compounds were formulated by diluting the stock suspension with water to give various concentrations of test compound in the final formulation. The potted plants (one pot per compound) were placed on a revolving turntable and sprayed with 100–110 milliliters of test compound formulation by use of a DeVilbis spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at 80±5° F. and 50±5 percent relative humidity for four days, after which a mortality count of motile forms was made. Microscopic examination for motile forms was made on the leaves of the test plants. Any individual which was capable of locomotion upon prodding was considered living. Each compound was then rated by determining the concentration of compound required to kill one-half of the mite population.

The results of these tests are set forth in Table III, below.

TABLE III

| Compound | Mite Test Rating [3] |
|---|---|
| 1 | 150 |
| 2 | 150 |
| 3 | 700 |
| 4 | 300 |

[3] Values are the concentration of compound, in parts of compound per million parts of applied formulation, by weight, required to kill one-half of the mite population.

In order to determine the efficacy of the compounds of this invention as miticides under actual field conditions, the following field tests were carried out for Compounds 1 and 2. Naturally mite-infested Tendergreen beans actively growing under normal field conditions in the Northeastern United States were sprayed to drip with several aqueous solutions of Compounds 1 and 2 containing 1.0, 0.5, and 0.25 pound of compound, respectively, per 100 gallons of applied solution. The bean plants were sprayed four times at weekly intervals. After the second and third spraying, mite counts were made to determine percent reduction of population, defined as $$\frac{\text{No. of mites on control} - \text{No. of mites on treatment}}{\text{No. of mites on control}} \times 100$$

After the last spraying, the treated plants were also rated with regard to phytotoxic effects and plant vigor. The following designations were used.

Phytoxicity Rating:
1=equal to check.
2=light burning.
3=moderate burning.
4=severe burning.
5=plant dead.

Plant Vigor Rating:
1=better than check.
2=equal to check.
3=slight stunting.
4=moderate stunting.
5=severe stunting.

The results of these tests are summarized in Table IV, below.

TABLE IV

| Compound | Concentration (lbs./100 gals.) | Reduction of Population | | Phytotoxicity Ratings | Plant Vigor Rating |
|---|---|---|---|---|---|
| | | After 2d spray | After 3d spray | | |
| 1 | 1.0 | 83 | 90 | 2 | 2 |
| | 0.5 | 49 | 42 | 1 | 2 |
| | 0.25 | 56 | 58 | 1 | 2 |
| 2 | 1.0 | 64 | 83 | 2 | 3 |
| | 0.5 | 82 | 79 | 1 | 2 |
| | 0.25 | 71 | 47 | 1 | 1 |

It can be seen that compounds of the formula:

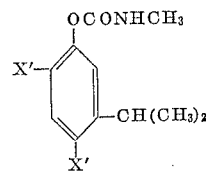

wherein X' is selected from the group consisting of hydrogen, chlorine, and bromine atoms, and at least one X' is selected from the group consisting of chlorine and bromine, are particularly effective in pesticidal action.

The compounds of this invention generally may be applied to achieve pesticidal action in various ways. They may be applied per se, as solids, or in vaporized form, but are preferably applied as the toxic components in pesticidal compositions.

The compositions can be applied as dusts, as liquid sprays, or as gas-propelled sprays and may contain in addition to a carrier additives such as emulsifying agents, wetting agents, binding agents, gases compressed to the liquid state, odorants, stabilizers and the like. The exact quantity of the compounds of this invention to be utilized in pesticidal compositions will be found to vary rather widely and depends to some extent upon the type of composition in which the material is being employed, method of application, nature of the pest is to be controlled, and other commonly encountered factors. Concentrations as low as 0.0001 percent may be employed. In general, however, compositions containing about 0.05 percent, by weight, in either a liquid or solid carrier, give excellent results. For some requirements, stronger concentrations may be desirable up to a maximum of 10 percent. Liquid carriers which may be employed include water, organic solvents, and mineral oils as well as other solvents or suspending agents. Solid carriers which may be used include talc, bentonite, diatomaceous earth, pyrophyllite, fuller's earth, lime, gypsum, flours derived from cotton seeds and walnut seeds, or any other similar powder.

What is claimed is:
1. Compounds of the formula:

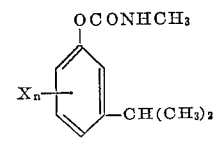

wherein X is a member of the group consisting of chlorine and bromine, and $n$ is an integer having an a value of from 1 to 4.

2. 2-chloro-5-isopropylphenyl N-methylcarbamate.
3. 2-bromo-5-isopropylphenyl N-methylcarbamate.
4. 4-chloro-3-isopropylphenyl N-methylcarbamate.
5. 4-bromo-3-isopropylphenyl N-methylcarbamate.
6. 2,4-dichloro-5-isopropylphenyl N-methylcarbamate.
7. 2,4-dibromo-5-isopropylphenyl N-methylcarbamate.
8. Insecticidal and miticidal compositions comprising a carrier and, as an active toxicant, a compound of the formula:

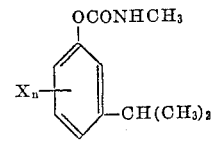

wherein X is a member of the group consisting of chlorine and bromine, and $n$ is an integer having a value of from 1 to 4.

9. The method for killing insects and mites which comprises applying to them a compound of the formula:

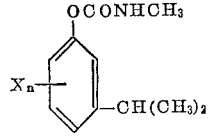

wherein X is a member of the group consisting of chlorine and bromine, and *n* is an integer having a value of from 1 to 4.

10. Method for killing insects and mites which comprises applying to them 2-chloro-5-isopropylphenyl N-methylcarbamate.

11. Method for killing insects and mites which comprises applying to them 2-bromo-5-isopropylphenyl N-methylcarbamate.

12. Method for killing insects and mites which comprises applying to them 4-chloro-3-isopropylphenyl N-methylcarbamate.

13. Method for killing insects and mites which comprises applying to them 4-bromo-3-isopropylphenyl N-methylcarbamate.

14. Method for killing insects and mites which comprises applying to them 2,4-dichloro-5-isopropylphenyl N-methylcarbamate.

15. Method for killing insects and mites which comprises applying to them 2,4-dibromo-5-isopropylphenyl N-methylcarbamate.

References Cited

UNITED STATES PATENTS

| | | | |
|---|---|---|---|
| 2,776,197 | 1/1957 | Gysin et al. | 260—479 X |
| 2,933,383 | 4/1960 | Lambrech | 260—479 X |
| 3,062,707 | 11/1962 | Kohn et al. | 260—479 |
| 3,062,868 | 11/1962 | Moore et al. | 260—479 |

OTHER REFERENCES

Immelman et al., J. of the South African Chemical Institute, vol. II, No. 3, 131–134 (1949).

Kolbezen et al., J. Agriculture and Food Chem., vol. 2, 1954.

LORRAINE A. WEINBERGER, *Primary Examiner.*

A. LOUIS MONACELL, LEON ZITVER, *Examiners.*

I. R. PELLMAN, R. K. JACKSON, *Assistant Examiners.*